United States Patent [19]

Hildebrand

[11] 3,748,912
[45] July 31, 1973

[54] GYROSCOPE WITH UNIVERSALLY MOUNTED ROTOR

[75] Inventor: George L. Hildebrand, Marblehead, Mass.

[73] Assignee: General Electric Company, Wilmington, Mass.

[22] Filed: July 17, 1968

[21] Appl. No.: 745,494

[52] U.S. Cl. .................................................. 74/5 F
[51] Int. Cl. ............................................... G01c 19/16
[58] Field of Search ............................................ 74/5

[56] References Cited
UNITED STATES PATENTS

| 2,752,792 | 7/1956 | Draper et al. | 74/5.34 |
| 2,939,322 | 6/1960 | Sedgfield et al. | 74/5 |
| 2,995,938 | 8/1961 | Brodersen et al. | 74/5.7 |
| 3,211,011 | 10/1965 | Litty | 74/5 |
| 3,264,880 | 8/1966 | Fischel | 74/5 |
| 3,301,073 | 1/1967 | Howe | 74/5.7 |
| 3,354,726 | 11/1967 | Krupick et al. | 74/5 |
| 3,452,608 | 7/1969 | Stiles | 74/5 |
| 3,489,016 | 1/1970 | Quinby | 74/5 |

Primary Examiner—Robert F. Stahl
Attorney—Richard E. Hosley, George A. Herbster, Frank L. Neuhauser, Oscar B. Waddell and Melvin M. Goldenberg

[57] ABSTRACT

A gyroscope with a universally mounted rotor including application as a north-seeking gyroscope. A planar, multiportion member transverse to a shaft axis and an axially rigid rod universally support the rotor on a rotating shaft. Magnetic trim means provide compensation to maximize decoupling of the rotor from the shaft.

17 Claims, 7 Drawing Figures

PATENTED JUL 31 1973

INVENTOR
GEORGE L. HILDEBRAND

BY George A. Herbster
ATTORNEY

INVENTOR
GEORGE L. HILDEBRAND

BY *George A. Herbster*
ATTORNEY

GYROSCOPE WITH UNIVERSALLY MOUNTED ROTOR

BACKGROUND OF THE INVENTION

This invention is directed to gyroscopes and more particularly to gyroscopes in which a rotor is universally mounted to a driving shaft.

This application of a universal joint structure to mount a rotor to a shaft in a gyroscope has a wide range of applications. For example, rate gyroscopes including such universally mounted rotors can sense relative displacement of a supporting structure and the rotor to thereby indicate the magnitude and direction of a rate vector. Specifically, a rate gyro could constitute a north-seeking gyroscope with the rate gyro assembly sensing the earth's rate vector in a horizontal plane. In aircraft, preflight alignment of a low drift rate gyroscope system to true north could furnish sufficiently accurate navigational information in flight, such as azimuth information, especially where magnetic charts were not available or were inaccurate. In another application surveying equipment could be oriented with a rate gyroscope to provide alignment at a remote location.

In another broad application, a gyroscope with a universally mounted rotor could constitute a two-axis inertial reference to stabilize navigational platforms. A universally connected rotor, decoupled from the shaft, is a free rotating body in space; and the platform could be stabilized by follow-up control systems which realign the platform with the decoupled rotor.

The application of universal joints to gyroscopes has been attempted for a number of years, and the universal joints have taken several diverse forms. In one of the earliest approaches, a universal joint including two sets of bearing members joined on perpendicular axes connected a rotor to a driving shaft. Later, a ball and socket arrangement provided the universal connection. In another approach, the rotor shaft connecting the driving portion to the rotor was necked down to produce a flexure. Yet another approach incorporated cross flexure members in combination with gimbal like rings. Still another universal joint assembly has utilized paralled, integral, universal joints to interconnect the rotor and the driving shaft.

Each approach has recognized specific operating problems which arise in the construction of any gyroscope incorporating a universally connected rotor. Basically these problems stem from the friction or spring constants of the universal joints which produce precessional torques and unacceptable drift rates. Further, certain approaches aimed at overcoming the drift problem have required an extremely complex construction for both the universal joint and the gyroscope. In other approaches the rotor must be operated at a critical speed to completely decouple the rotor thereby requiring special driving means calibrated for each individual gyroscope.

Alternatively means to vary the universal joint dynamic configuration have been provided. When positive spring forces were assured, magnets attracted the rotor when it was displaced from the shaft axis to act as a negative spring and cancel torques exerted by deflection of the universal joint. Mechanically adjustable internal members associated with the universal joint to vary the inertia and compensate for speed variations have also been incorporated. Neither approach permitted simple compensation or calibration after the completed system was constructed so interchangeability of the gyroscope with different power supplies required complex balancing techniques before complete decoupling was assured.

Therefore, it is an object of this invention to provide an improved construction for a universal joint which minimizes gyroscope drift errors.

Yet another object of this invention is to provide a universal joint adapted for mounting in a gyroscope without adverse affecting the overall gyroscope size.

Still yet another object of this invention is to provide a gyroscope including means for adjusting and balancing a universally mounted rotor externally from the gyroscope.

Another object of this invention is to provide a gyroscope which is especially adapted for platform stabilization.

Yet still another object of this invention is to provide a gyroscope which is especially adapted for use in determining the location of true north.

SUMMARY

In accordance with one aspect of this invention, a rotor is universally connected to a driving shaft by a planar, multiportion, integral member. Certain portions, affixed to the rotor and shaft, are universally connected together. Means are provided to minimize axial displacement of the rotor relative to the shaft. Other means react with the rotor and produce countertorques to minimize drift.

This invention is pointed out in the appended claims. The above and further objects and advantages of this invention may be better understood by referring to the following detailed description taken in conjunction with the accompanying drawings.

DESCRIPTION OF ILLUSTRATIVE EMBODIMENTS

Figure 1:
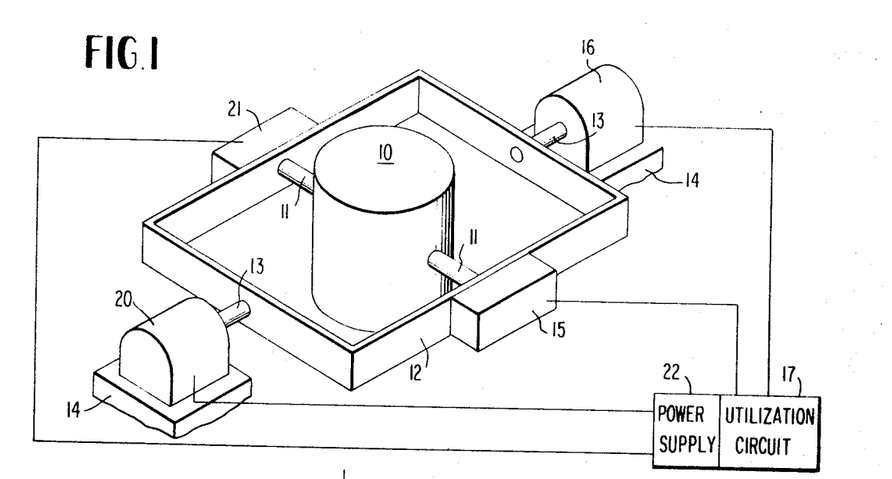
FIG. 1 schematically illustrates a gyroscope assembly mounted in a Cardan suspension.

Although this invention may be utilized in various reference system configurations, one exemplary configuration is outlined in FIG. 1. A gyroscope 10 which contains a rotating inertial mass therein is suspended to rotate about a minor axis defined by trunnions 11 affixed to a gimbal 12, the gimbal 12 being rotatable about a major axis defined by trunnions 13 supported on a fixed support member generally designated by 14. Hence, the entire assembly provides 2° of freedom for the gyroscope in a conventional Cardan suspension. Indications of the relative positions of the gyroscope 10, the gimbal 12 and the support member 14 may be obtained by means of pickoffs 15 and 16. The outputs of these pickoffs may be coupled to a utilization circuit 17 including means for displaying the relative positions of the gimbals or means for performing a control function.

To control rotation about the minor axis, a torquer 20 is located to drive the trunnions 13 by applying a torque about the major axis. Such a torque acts, through the gyroscope precession, to rotate the gyroscope 10 about the minor axis. Similarly, another torquer 21 associated with the trunnions 11 applies torque about the minor axis to rotate the gimbal 12 about the major axis. Both torquers 20 and 21 may be energized by a power supply 22 which may be under control of the pickoff signals as is known in the art.

The exact construction of the gyroscope 10 is not critical to an understanding of this invention. For purposes of this discussion, however, a symmetrical gyroscope such as that described and claimed in U.S. Pat. No. 2,731,836, issued to Harry C. Wendt on Jan. 24, 1956, and assigned to the same assignee as the present invention is specifically shown in FIG. 2. A planar frame member 23 supports a shaft 24 at right angles thereto. Mounted on one side of the frame member 23 are stator windings 25. Hysteresis material 26 is affixed on a lower rotor 27 connected for rotation with the shaft 24 which is mounted in the planar member 23 by bearings 30 captured in the frame member 23. Energization of the stator windings 25 causes the shaft 24 to be rotated at a speed dependent upon the frequency of the applied power. Means for connecting the stator windings to the power supply are well known in the art and are omitted for purposes of clarity. The lower rotor 27 may have an inertia which is of the same order of magnitude as an upper rotor 31. This upper rotor includes internal pickoff assemblies 32 and torquers 33 which react with magnetically conducting portions 34 on the upper rotor 31. In accordance with this invention, the upper rotor 31 is connected to the shaft 24 by a universal joint assembly 35 so that the upper rotor 31 may be decoupled from the shaft 24.

It will be useful to consider FIG. 3 and the theory of a universal joint gyro, particularly of the specific universal assembly described hereinafter. A driving member 36 rotates a shaft 37 about a Z axis with X and Y axes perpendicular to each other and mutually perpendicular to the Z axis. Connected to the shaft 37 and to a rotor 40 is a universal joint 41. Although the universal joint 41 is an integral member, it is spaced along the Z axis for purposes of clarity in FIG. 3. A first portion 42 of the universal joint 41 is connected to the shaft 37. A second portion 43 is connected to the rotor 40. The first and second portions 42 and 43 are then connected to an intermediate portion 44 by means of connecting portions 45 and 46. Each connecting portion is torsionally compliant along axes defined thereby so the intermediate portion 44 can rotate with reference to the first portion 42 and the second portion 43. Hence, the rotor 40 can be displaced from the Z axis to rotate about other axes. During such displacement, the intermediate portion 44 defines, at a given instant in time, three axes, $a$, $b$ and $c$, displaced from the X, Y and Z axes. It is assumed that no forces act along the Z axis which tend to displace the rotor 40 in the following theoretical discussion and that displacement of the rotor 40 is limited to small angles.

The average torques developed about the X, Y and Z axes for a deflection of the rotor 40 about the Y axis during a complete revolution are:

$$T_{x(y)} = T_o \tan(\beta_y/2 - mn \tan(\beta_y/2) \sin^2(\beta_y/2) - \tfrac{1}{2} c_f n \sin(\beta_y) + (2/\pi)(F_a + F_b)[\beta_y/\tan(\beta_y)] + n \tan(\beta_y/2) [K_b \cos(\beta_y) + K_a \cos(\beta_y/2)]$$

(1)

$$T_{y(y)} = -(n^2/2) \sin(\beta_y)[(a+b-c) + (a+I_1/2)\tan^2(\beta_y)]$$

(2)

and $$T_{z(y)} = T_o + 2mn \sec(\beta_y) \sin^4(\beta_y/2) - \tfrac{1}{2} c_f n [\sec(\beta_y) + \cos(\beta_y)] - (2/\pi)(F_a + F_b)\beta_y - (n/2)\cos(\beta_y)[(K_a + K_b)\tan^2(\beta_y) - K_b(\sec(\beta_y)-1)^2]$$

(3)

However, $T_z = T_w$, the windage torque, and $\beta_y$, the angle of deflection, is small so $\sin(\beta_y) = \tan(\beta_y) = \beta_y$ and $\cos(\beta_y) = \sec(\beta_y) = 1$. By manipulating the equations, solving equation (3) for $T_o$ and substituting it in equation (1), equations (1) and (2) are reduceable to:

$$T_{x(y)} = 2/\pi (F_a + F_b) + [T_w + n(K_a+K_b)/2]\beta_y$$

(4)

and $$T_{y(y)} = -(n^2/2) \beta_y (a+b-c)$$

(5)

where:
$F_a$ = dry friction along $a$ axis
$F_b$ = dry friction along $b$ axis
$n$ = speed of the drive shaft
$K_a$ = viscous friction coefficient along $a$ axis
$K_b$ = viscous friction coefficient along $b$ axis
$a$ = intermediate portion inertia about $a$ axis
$b$ = intermediate portion inertia about $b$ axis
$c$ = intermediate portion inertia about $c$ axis In an integral universal joint where only torsional forces are developed within the universal joint, $$F_a = F_b = 0$$

(6)

and $$K_a = K_b = 0$$

(7)

so:

$$T_{x(y)} = \tfrac{1}{2} Tw \beta_y$$

(8)

Deflection of the rotor 40 about the Y axis also causes a spring force to be developed by the universal joint which appears as a torque component $K\beta_y$ about the Y axis where $K$ is the spring constant. So equation (5) becomes:

$$T_{y(y)} = -(n^2/2)\beta_y (a+b-c) + K\beta_y$$

(9)

A similar analysis for deflection of the rotor 40 about the X axis shows that:

$$T_{x(x)} = -(n^2/2)\beta_x (a+b-c) + K\beta_x \quad (10)$$

and $$T_{y(x)} = \tfrac{1}{2} T_w \beta_x \quad (11)$$

By combining equations (8) and (10) and equations (9) and (11), the total torque for any deflection of the rotor can be defined as:

$$T_x = \tfrac{1}{2} T_w \beta_y + K\beta_x - (n^2/2)\beta_y (a+b-c) \quad (12)$$

and $$T_y = \tfrac{1}{2} T_w \beta_x + K\beta_y - (n^2/2)\beta_y (a+b-c) \quad (13)$$

If it is assumed that $T_w$ is negligible in comparison with the other terms in the equations, then when $$n = (2K/a+b-c) , \quad (14)$$

$$T_x = T_y = 0 \quad (15)$$

and the rotor 40 is effectively decoupled from the shaft 37.

Figure 2:
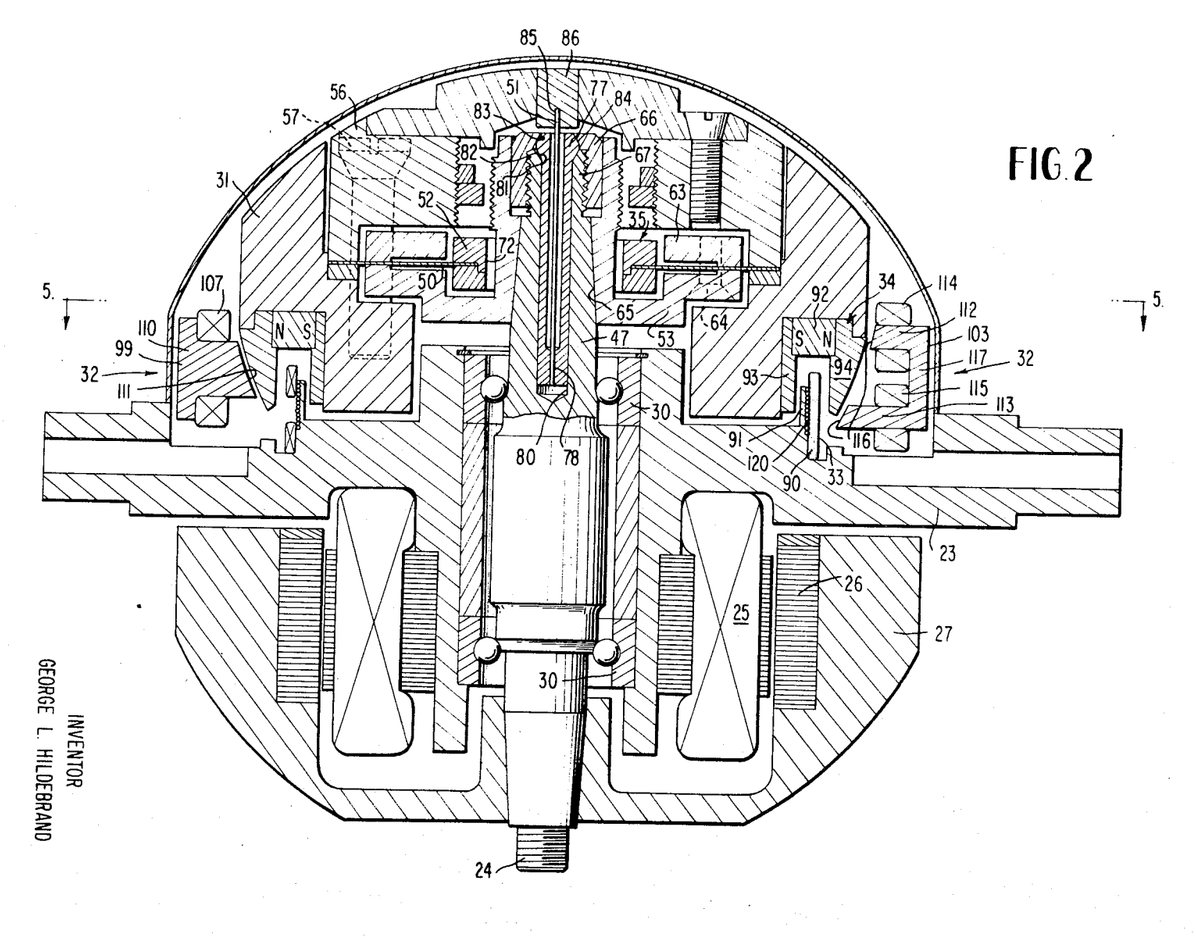
FIG. 2 is a section of a gyroscope constructed in accordance with this invention.

As shown in FIG. 2, the upper rotor 31 is connected to an upper shaft portion 47 by means of a planar member 50 and an axially rigid rod 51. These two members, which include an inertia member 52 with polar and transverse moments of inertia constitute a universal joint connected to the upper shaft portion 47 by a collar assembly 53 and to the upper rotor 31 in accordance with the theory and assumptions discussed in reference to FIG. 3.

Figures 3, 4:
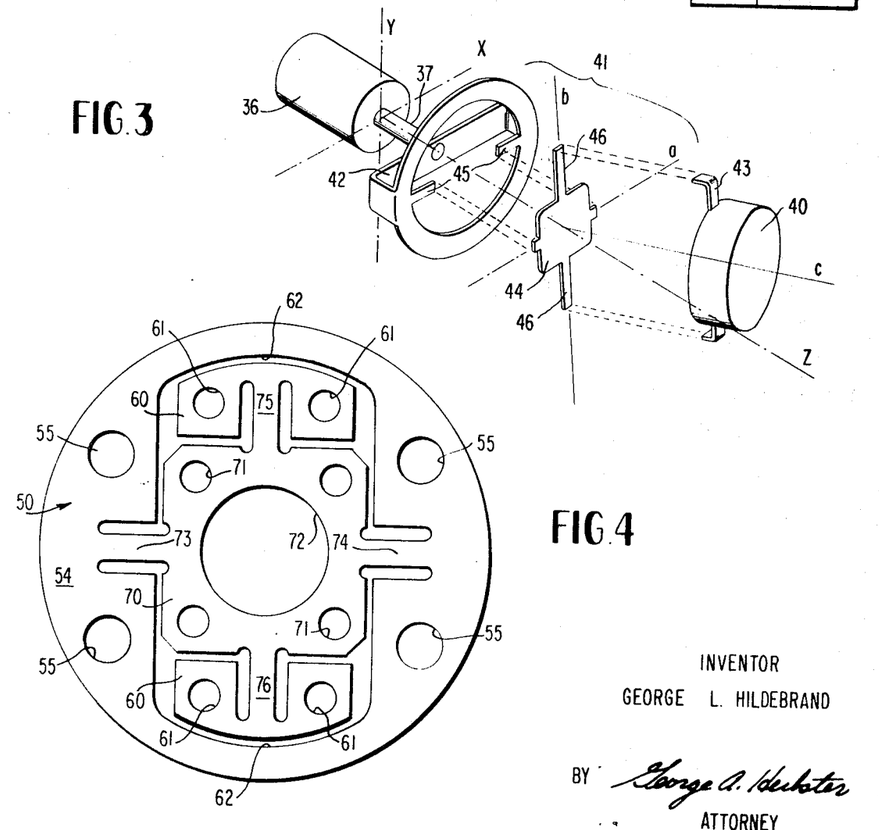
FIG. 3 is a diagram useful in understanding the theory of this invention.
FIG. 4 is a detailed view of one portion of a universal joint assembly shown in FIG. 2.

FIG. 4 illustrates the details of the planar member 50 having a generally circular outline. Specifically, an outer portion 54 with a plurality of apertures 55 formed therethrough is connected to the upper rotor 31 by means of an insert assembly 56 and a plurality of bolts 57 which extend through the apertures 55 as illustrated in FIG. 2. Hence, the outer portion 54 shown in FIG. 4 is retained in a planar orientation, the plane being defined by the position of the upper rotor 31 with respect to the shaft.

Two identical portions 60 with a plurality of apertures 61 are disposed at the opposite ends of an elongated opening 62 formed in the planar member 50 and essentially bounded by the outer portion 54. Each portion 60 is connected to the collar assembly 53 shown in FIG. 2 by clamping the identical portions 60 thereto with a clamp 63. These elements are positioned by a bolt 64 or other securing means.

As specifically shown in FIG. 2, the collar assembly 53 has a tapered inner surface 65 which is forced over a complementary tapered surface on the upper shaft portion 47. Hence, the identical portions 60 are maintained in a constant planar orientation. This plane is defined by the collar assembly 53 and is always transverse to the axis of rotation of the shaft 24.

Referring again to FIG. 4, the first portion 54 and the identical portions 60 are universally connected by an intermediate portion 70. The intermediate portion 70 has means, such as a plurality of apertures 71, formed therethrough for connecting the inertia member 52 thereto to constitute a conventional universal joint spider. In addition, the intermediate portion 70 and inertia member 52 have a central aperture 72 to permit the upper shaft portion 47 to pass therethrough. This intermediate portion 70 is connected by torsionally compliant strips 73 and 74 to the outer portion 54 and by torsionally compliant strips 75 and 76 to the identical portions 60 so the intermediate portion 70 is capable of rotation relative to the upper rotor 31 about an axis through the strips 73 and 74 and relative to the collar assembly 53 about an axis defined by the strips 75 and 76. Hence, the upper rotor 31 is universally connected to the upper shaft portion 47.

As the intermediate portion 70 has the inertia member 52 rigidly affixed thereto, a polar moment exists for the assembly which is equivalent to the spider polar moment described above. If the rotor speed is maintained in accordance with equation (14), the torques about the X and Y axes relative to the drive shaft are zero. Thermal stability can be obtained by forming the universal joint of Ni-Span C or other material which has a thermally stable elastic modulus.

Lateral and torsional stability for the upper rotor 31 exist with this construction of the planar member 50. However, the planar member 50 shown in FIG. 2 is not axially stable with respect to the shaft 47. Means must be provided to achieve axial stability. One such means is an axially rigid rod 51 which is affixed to the upper rotor 31 and to the upper shaft portion 47. One end of the rod 51 is permanently affixed in a bushing 77 which is coaxial with the rod. The bushing 77 engages the rod along a portion 78, but is spaced from the rod 51 along the remaining bushing length. It is disposed in an axial bore 80 formed in the upper shaft portion 47 to be internally spaced from the end of the bore 80 to permit compensation of differential thermal coefficients of expansion. Axial movement of the bushing 77 is prevented by engagement of a conical surface 81 formed at the end of the upper shaft portion 47 and a complementary conical surface 82 formed on the bushing 77. A nut assembly 66 with a conical surface 83 formed thereon bears on another outer conical surface 84 formed on the bushing 77 when the nut 66 is tightened on the threaded portion 67 of the upper shaft portion 47.

The other end portion 85 of the rod 51 is permanently affixed to an insert 86 which is clamped to the upper rotor 31. The end portion 84 is coaxial with the axis of rotation of the upper rotor 31.

When assembled, the bushing 77 orients the rod 51 so that the end portion 78 is coaxial with the axis of rotation of the shaft 24. The insert 86 orients the end portion 85 of the rod 51 so that it is coaxial with the axis of rotation for the upper rotor 31. For small deflections of the rotor axis from the shaft axis, the rod 51 maintains its axial rigidity to thereby provide the universal joint with the property of being free from axial forces. However, the rod is compliant about axes transverse to the shaft axis.

Therefore, as the universal joint assembly in FIG. 2 is axially stable, the theoretical assumptions may be practically satisfied. Further, the requirements of equation 14 can be met so that no appreciable drift will result from internal forces or torques generated by the universal joint during rotor displacement. Relative ease of repeatable universal joint manufacture may be realized because the planar member 50 is thin and can be formed by means other than punching or machining. In some applications conventional photo-etching techniques may be used. These techniques are highly accurate so manufacture of a planar member with repeatable characteristics is simplified.

Portions of a pickoff assembly 32 and a torquer 33 which sense and control the position of the upper rotor 31 are shown in FIG. 2. The orientation of a pickoff and torquer system may be understood by referring to FIGS. 2 and 5 simultaneously. In this particular embodiment, the torquer 33 comprises a coil 90 disposed on an axially extending annular frame member 91 which is integrally formed with the frame member 23. Affixing the torquer coil 90 to the supporting member 91 will be described more fully hereinafter. An annular, radially poled magnet 92 is located in the upper rotor 31 and lies in a plane transverse to the upper rotor axis of rotation. Annular pole shoes 93 and 94 are concentrically mounted to the upper rotor 31 and depend from the radial terminations of the magnet 92 to be partially axially coextensive with the torquer coil 90. Therefore, the coil 90 and the magnet assembly in the upper rotor 31 together constitute a d'Arsonval torquer arrangement.

Figure 5:
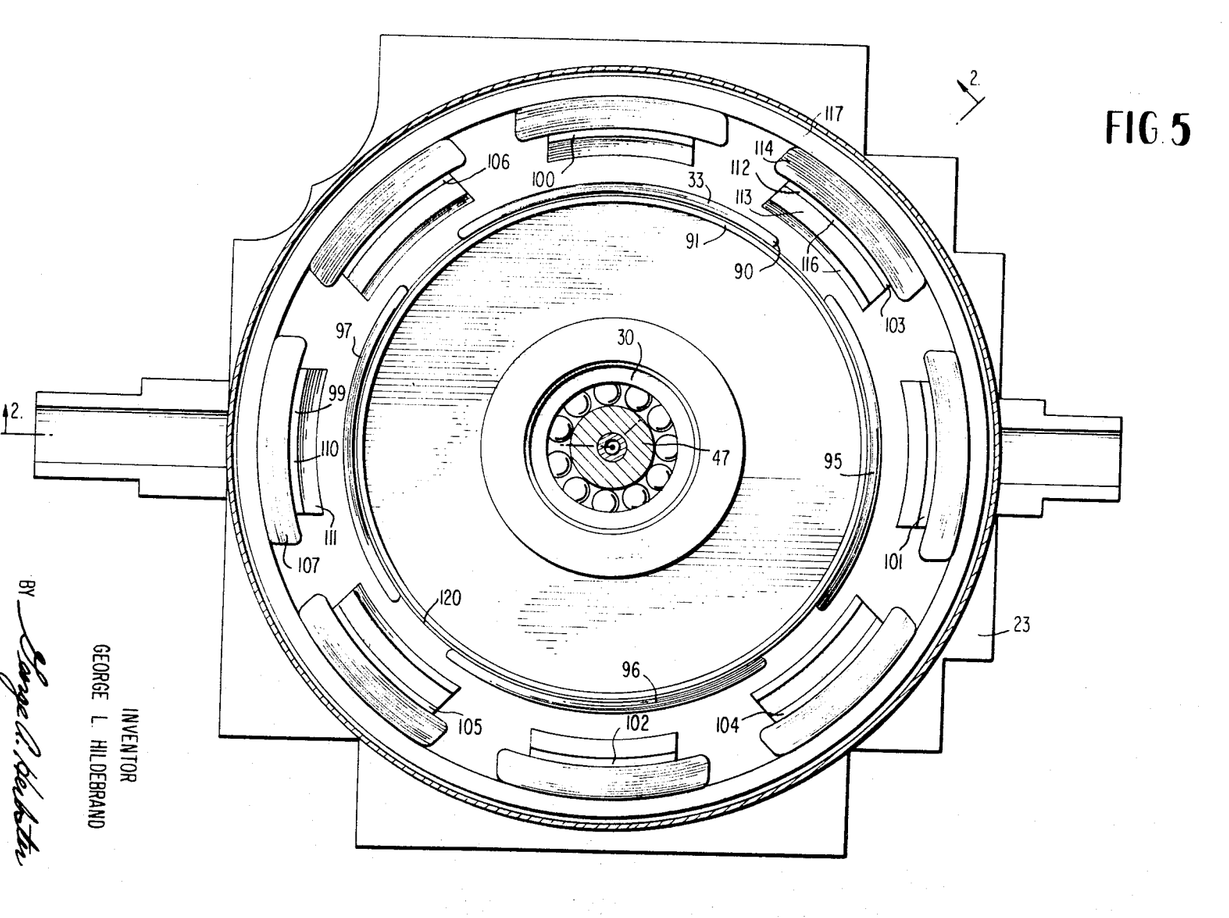
FIG. 5 illustrates a pickoff and torquer arrangement in a gyroscope and is taken along lines 5—5 in FIG. 2.

Four torquer windings are equiangularly spaced about the support member 91 in this particular embodiment. In addition to the torquer 33, torquers 95, 96 and 97 are shown in FIG. 5 so that the torquers 33 and 96 lie on one axis while the torquers 95 and 97 lie on an axis perpendicular thereto. It will be obvious to those skilled in the art that additional torquers can be disposed about the periphery of the support member if further torquing resolution is desired. Alternatively fewer torquers might also be utilized in particular applications.

FIG. 2 shows one portion of a pickoff assembly 32 which is also supported on a frame 23. The pickoff assembly specifically shown in the embodiment of FIGS. 2 and 5 utilizes the principal of an E pickoff in which the sensing portions are designated by numerals 99, 100, 101 and 102. Intermediately located between the sensing units are the energization units 103, 104, 105 and 106. As all the pickoff sensing units are identically constructed and as all the energizing units are identically constructed, a detailed discussion of these units is limited to the pickoff sensing unit 99 and the energizing unit 103. As specifically shown in FIG. 2, the pickoff sensing unit 99 includes a coil 107 which is wrapped about a pole piece 110 with a pole face 111 being formed coextensively with the surface at the depending pole shoe 94 on the upper rotor 31. The surface of the outer pole shoe 94 and the pole face 111 are radially formed about the center of gravity of the upper rotor 31.

The energizing member 103 includes two radially extending poles. An upper pole 112 and a lower pole 113 have coils 114 and 115 wrapped thereupon. The coils 114 and 115 are wound so they produce fluxes which are in the same direction in a loop magnetic circuit. The pole surfaces 116 of the energizing member 103 are also arcuately formed about the center of gravity of the upper rotor 31.

Assume that forces act on the gyroscope to move the frame 23 and the pickoff sensing unit 99, relative to the upper rotor 31 to cause a portion of the pole shoe 94 adjacent to energizing coil 103 to move toward the upper pole 112. The reluctance between the upper pole 112 and the pole shoe 94 is decreased while the reluctance between the pole shoe 94 and the lower pole 113 is increased. As the poles associated with all the energizing members and pickoff members are magnetically connected by a ring portion 117, a component of flux produced in the upper pole 112 is not carried by the lower pole 113. Instead it travels through the pole shoe 94 to the pickoffs 100 and 101. Similarly, flux will travel from the energizing unit 104 and to the pickoffs 101 and 102. However, at the energizing units 105 and 106 the lower pole-to-pole shoe reluctance will be decreased and the component of magnetic flux from the lower pole not coupled to the upper pole passes through the pole shoe 94 to the adjacent pickoff sensing units. As all the coils on the upper poles and all the coils on the lower poles are wound to be of the same polarity, the net flux through the pickoffs 102 and 100 will be zero. However, the flux components in the energizing units 106 and 105 will be coupled to the pole 110 and coil 107 of the pickoff sensing unit 99 in the same direction to produce an AC voltage of a given phase. At the pickoff sensing unit 101 the flux will be of the opposite polarity so an AC voltage 180° out of phase with the voltage produced at the pickoff sensing unit 99 will be produced. A similar analysis will show that other movements of the upper rotor 31, different voltages will be produced at the various pickoffs and these will indicate the direction and magnitude of the input force vector applied to the gyroscope.

When the rotor axis and the shaft axis are aligned, the pole shoe 94 is so disposed so the reluctance between the upper pole and the pole shoe and the lower pole and the pole shoe for each energizing unit are identical. Therefore, all the flux in the poles is coupled through the pole shoe 94 and back to the energizing unit so no flux links any of the pickoff coils.

A power supply for a given gyroscope using a universal joint can be constructed to provide a rotational speed in accordance with equation 14. However, in repetitive manufacture it is extremely difficult to maintain tolerances whereby substantially no inertia variations occur so that a given rotor speed would produce complete decoupling for all gyroscopes. Minor variations in the frequency can also occur to vary the speed of the gyroscope rotor. In addition a windage torque may exist to thereby add an additional torque to the system. As another aspect of this invention, therefore, compensation schemes are provided to assure complete decoupling of the rotor.

In accordance with equations (12) and (13) torques are produced about the X and Y axes only when the rotor and shaft axes of rotation are not coincidental. When the power supply and rotor are not properly mated, the rotor speed may vary from that of equation (14). Therefore to maintain complete decoupling a countertorque must be applied which is:

$$\text{counter torque} = ]n^2/2 \ (a+b-c) - K] \ \beta_x.$$

(16)

To this end a coil 120 is mounted to the support 91 so that half the coil 120 lies parallel to and coextensively with the inner annular pole shoe 93. This coil 91 is adapted to be energized by a direct current which is variable in magnitude and polarity. In the particular embodiment shown, the coil 91 and the torquer coils 90 are bonded together and to the vertical support 91. As an alternative, the coil could be substituted by a single turn of foil, half of the turn being coextensive with the inner pole shoe 93. In either approach, energization of the coil 120 produces a uniform flux density with respect to the axis of the coil 120.

Once a gyroscope system is completed, and assembled, the only variable in equation (16) is $\beta_x$. Assume that the frame 23 in FIG. 2 moves with respect to the X axis. This produces a torque which tends to cause the gyroscope to precess about the Y axis. However, the movement of the rotor about the X axis unbalances the forces applied by the coil 120 to the upper rotor 31. By choosing the polarity and magnitude of current energizing the coil 120 properly, a counter torque is applied to the upper rotor 31 which cancels the torque produced by the speed variation.

Small windage torques may also exist which could cause drift. The windage is minimized by encasing the entire gyroscope. However, drift caused by such windage torques should be a function which is proportional to the rotor displacement so the torquers 33, 95, 96 and 97 can be energized by a controlled current to provide compensation. Therefore, if conditions of the assumptions are not obtainable, means for compensating resultant drift can be and are provided.

Figure 6:
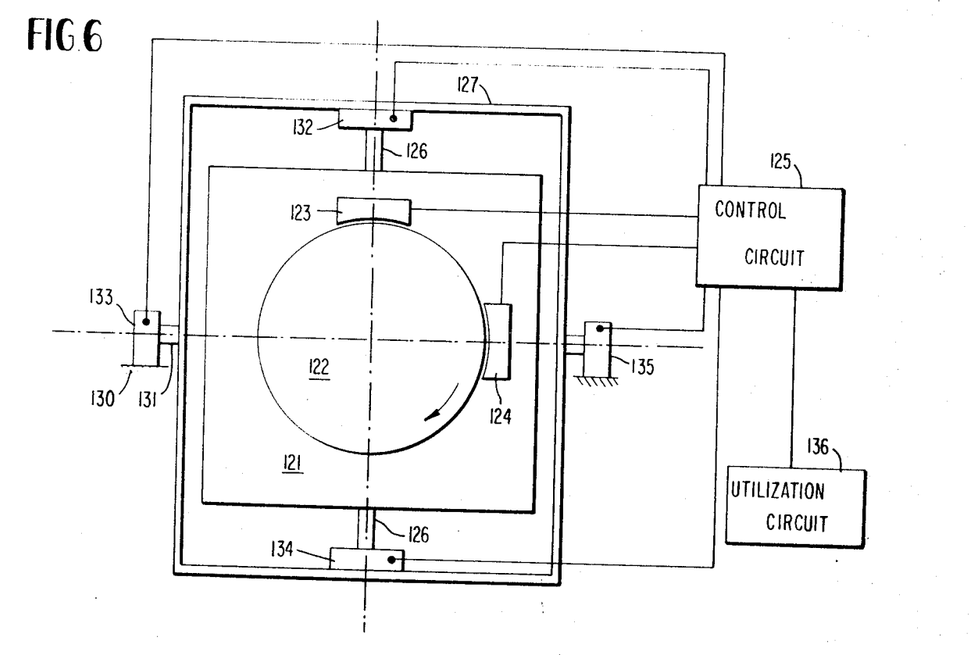
FIG. 6 illustrates a system utilizing a universally mounted rotor on a gyroscope for stabilizing a platform in space.
Figure 7:
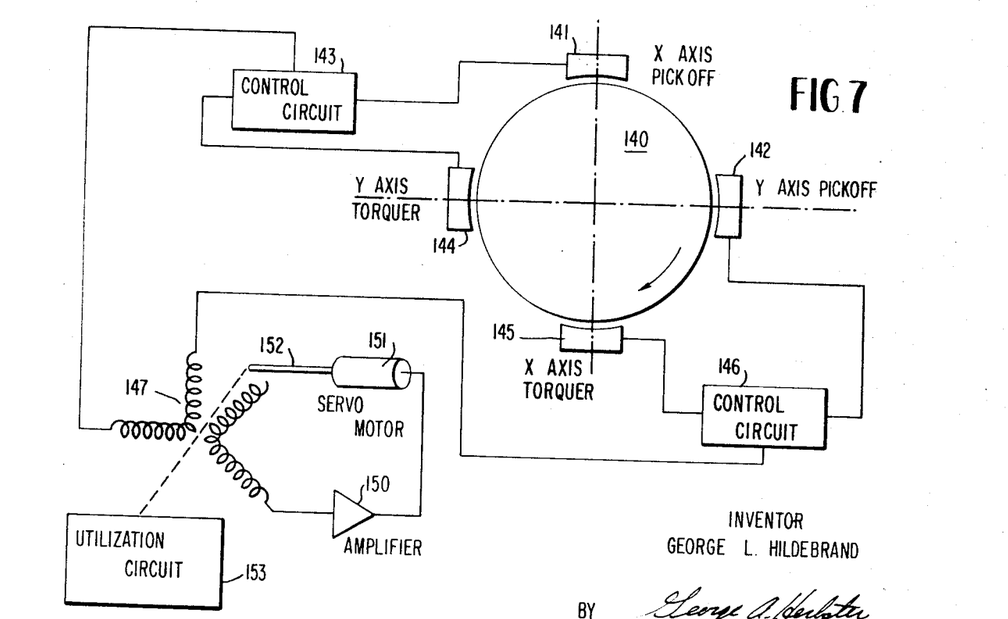
FIG. 7 illustrates a system utilizing a universally mounted rotor on a gyroscope in a system for determining true north.

A gyroscope which utilizes a universally connected rotor can be used in a number of configurations. While many modifications and alternative constructions can be evolved for a number of uses, FIGS. 6 and 7 present two applications and embodiments of a gyroscope system configuration as shown in FIG. 1. For example, a system for stabilizing a platform 121 in space is schematically shown in FIG. 6. A rotor 122 is universally mounted to the platform 121 and pickoffs 123 and 124 sense the position of the rotor 122 with respect to the platform 121. Assuming that the rotor 122 is completely decoupled from the platform 121 while rotating, any deviation of the platform 121 and the spin axis of the shaft will be sensed by the pickoffs 123 and 124, thereby producing signals fed to a control circuit 125.

Signals from the control circuit may then be applied to external torquing means. For example, the platform 121 might be connected through trunnions 126 to a gimbal 127 while the gimbal 127 would be coupled to a supporting frame 130 by trunnions 131. Torques could be applied through a torquer 132 and a torquer 133 with the positions of the gimbal 127 and the platform 121 being sensed by pickoffs 134 and 135. With this follow-up system any movement of the platform 121 with respect to the rotor 122 would be sensed in the pickoffs 123 and 124. Torques would be applied through the torquers 132 and 133 to realign the platform 121 to the rotor 122. As the rotor 122 is completely decoupled from the remainder of the gyroscopic assembly, the platform 121 would thereby be stabilized in space.

Another schematic is shown in FIG. 7 in which a rotor 140 is universally mounted to a shaft. X and Y axes pickoffs 141 and 142, equivalent to the pickoffs shown in FIGS. 2 and 5 are associated With the rotor 140. The X axis pickoff 141 is coupled through a control circuit 143 to energize a Y axis torquer 144. Similarly, the energization of an X axis torquer 145 is varied by a control circuit 146 responsive to the Y axis pickoff 122. A resolver circuit including windings 147, an amplifier 150 and a servomotor 151 are connected to the control circuits 143 and 146. The motor output is coupled by a shaft 152 to a utilization device 153.

If the drive shaft for the rotor 140 is vertically oriented and the gyroscope is fixed, the gyro rotor drive shaft tends to be deflected by the horizontal component of the earth's rotation with respect to the rotor 140. The pickoffs 141 and 142 sense any deflection caused by this rate vector and act through the control circuits 143 and 146 to apply torques and rebalance the rotor 140. The currents required for the rebalancing are then monitored in the resolver windings 147. When the amplifier 150 and servometer 151 act as a rebalancing network, the direction of the horizontal component of the earth's rate is indicated. As this horizontal rate vector lies on a north-south line, true north may be easily indicated. A true north indication may thereby be readily obtained in a variety of vehicles or applications merely by energizing the gyroscope and its associated circuitry, stabilizing the shaft in the vertical direction and force-balancing the rotor 31.

It will be obvious to those of ordinary skill in the art that the physical embodiment of the invention described above may take many forms. Different gyroscope arrangements, different torquer arrangements, different pickoff arrangements, various other means for electromagnetically compensating for changes in speed, and other variations may be made without departing from the true spirit and scope of the invention. Therefore, it is the object of the appended claims to cover all such modifications which come within the true spirit and scope of the invention.

What is claimed as new and desired to be secured by Letters Patent of the United States is:

1. In a gyroscope including a shaft, means for driving the shaft about a shaft axis and a rotor to be rotated about a spin axis, a mounting assembly universally connecting the rotor to the shaft comprising:
   a. An integral substantially planar member having universally coupled portions connected to the rotor and shaft comprising first and second portions connected to the rotor and shaft, respectively, a substantially rectangular intermediate inertial portion having an inertia member connected thereto for increasing the polar and transverse moment of said universal mounting, and first and second pairs of connecting portions for said intermediate portion said second portion being connected to said intermediate portion to be substantially adjacent opposite sides of said intermediate portion and said intermediate and second portions lie in an elongated opening substantially peripherally surrounding said intermediate and second portions, said first portion being connected to said intermediate portion by connecting portions between said first portion and the other side of said intermediate portion,
   b. an axially rigid, bendable member connected to the rotor and shaft, portions of said member remaining coaxial with the shaft and spin axes.

2. A gyroscope as recited in claim 1 wherein said planar member and said axially stiff member are formed of a material which exhibits substantially no spring constant variation over a thermal operating range.

3. A gyroscope comprising:

a. a support means;
b. a rotor;
c. a driven shaft mounted to said support means for rotation about a shaft axis;
d. a substantially planar member comprising a first portion connected to said rotor, a second portion connected to said shaft, and an inertial portion connecting said first and second portions along first and second perpendicular axes, said rotor thereby being connected to said driven shaft to be rotated about a rotor spin axis;
e. an axially stiff rod having a first portion coaxially connected to said shaft and a second portion connected to said rotor coaxially with said gyro spin axis, said rotor thereby being universally connected to said shaft;
f. means for rotating said driven shaft at a speed substantially canceling torques produced by said planar member and said axially stiff rod; and
g. means on said support means and said rotor operating to sense and indicate relative displacement of said rotor and support means.

4. A gyroscope as recited in claim 3 wherein said planar member includes inertia means integrally mounted thereon, the rotor speed being maintained so that a substantially zero net torque acts on said rotor and trim means connected to said rotor and said support means interacting to substantially eliminate the development of such torques by rotor speed variations during rotor displacement.

5. A gyroscope as recited in claim 3, said first portion of said planar member being a substantially cylindrical member, said inertial portion comprising a substantially rectangular member located centrally in an elongated aperture formed in said first portion, said second portion lying on either side of said intermediate portion in said elongated aperture, said first portion being connected to said second portion by a first pair of connecting portions and said second portion being connected to said intermediate portion by a second set of connecting portions perpendicular to said first connecting portions, said connecting portions being integrally formed with said planar member to be compliant about the perpendicular axes and laterally and torsionally stiff with respect to the shaft axis.

6. A gyroscope as recited in claim 5 wherein said trim means comprises an electrical solenoid having a coil mounted on said support means and an armature mounted on said rotor, energization of said solenoid causing complete decoupling of said rotor from said shaft.

7. A gyroscope as recited in claim 6 wherein said electrical solenoid is constituted by an electrical coil concentric with said shaft, an annular magnet disposed in said rotor and pole shoes connected to said magnet, said pole shoes being partially axially coextensive with said coil when the rotor spin and drive shaft axes are aligned.

8. A gyroscope as recited in claim 6 wherein said coil is mounted on said stator and is adapted to be energized by a reversible direct current, said magnet and pole shoes being mounted on said rotor, said pole shoes additionally serving to coact with said displacement sensing means.

9. A gyroscope as recited in claim 6 additionally comprising means for stabilizing and orienting said gyroscope with a vertical shaft axis and force balance means responsive to displacement of said rotor when said rotor is decoupled from the shaft to indicate angular velocity of the gyroscope in a horizontal plane.

10. A gyroscope as recited in claim 9 wherein said force balance means comprises a plurality of torquer and electrical pickoff means responsive to and acting upon said rotor to force balance said rotor, said gyroscope additionally including resolving means energized in response to said pickoff and torquer signals to indicate the orientation of said gyroscope with respect to said rotor.

11. In a gyroscope including a drive shaft and means for rotating the drive shaft, a rotor and universal joint means having a spring constant and an inertia for connecting the rotor to the drive shaft, the driving means rotating the drive shaft at a speed which substantially cancels torques introduced by displacement of the rotor, the improvement of means for cancelling the displacement torques comprising solenoid means including the rotor mounted for exerting a torque on the rotor proportional to the rotor displacement.

12. A gyroscope as recited in claim 11 wherein said solenoid means is constituted by coil means mounted on said stator and an annular, radially polarized magnet adapted for mounting on the rotor.

13. A gyroscope as recited in claim 12 wherein said coil is concentrically mounted and is adapted to be energized by a reversible direct current and a pair of radially spaced, annular pole shoes axially extending from said magnet to be partially axially coextensive with said coil whereby a torque is exerted on the rotor during rotor displacement.

14. A gyroscope as recited in claim 13 wherein the universal joint is constituted by a planar member generally transverse to said shaft axis having portions connected to the rotor and stator which are universally connected through an intermediate portion having a moment of inertia and means for preventing axial displacement of the rotor and the shaft.

15. A north-seeking gyroscope including a gyroscope having a universally mounted rotor decoupled from a vertically oriented driving shaft, pickoff and torquer means formed on the gyroscope and interconnected to torque-balance the rotor when the shaft is moved in response to the earth's rotation and means energized by said pickoffs and torquers for resolving signals therefrom into an indication of the position of true north.

16. A north-seeking gyroscope as recited in claim 15 wherein said rotor is connected to said drive shaft by a transverse planar member having portions connected to the rotor and the shaft which are universally connected through an intermediate, inertia portion on two perpendicular axes and means for preventing axial movement of the rotor with respect to the shaft, said gyroscope additionally comprising means for driving the rotor at a speed at which the inertia and spring constants of the universal joint are canceled.

17. A gyroscope as recited in claim 16 additionally comprising solenoid means including an axially extending coil concentrically disposed with respect to the shaft axis adapted to be energized by a direct current source, an annular, radially polarized magnet, and a pair of radially spaced, annular pole shoes axially extending from the radial terminations of said magnets to be partially axially coextensive with said coil when the rotor spin axis and the shaft axis are aligned whereby energization of the coil produces a torque about the gyroscope axes which compensates for torques produced when said rotor is displaced.

* * * * *